United States Patent Office 3,244,766
Patented Apr. 5, 1966

3,244,766
CATALYTIC PRODUCTION OF OLEFINS
Allen H. Keough, Holden, Mass., assignor to Norton Company, Worcester, Mass., a corporation of Massachusetts
No Drawing. Filed June 6, 1961, Ser. No. 115,092
4 Claims. (Cl. 260—682)

This invention relates to catalytic processes for dehydration processes and more particularly for the dehydration of alcohols in the vapor phase to produce olefins by the general reaction:

$$R\text{—}OH \rightarrow R' + H_2O$$

where R is an alkyl radical of two or more carbon atoms and R' is an olefin.

A wide variety of catalysts have been used to effect this reaction. Much of the knowledge of the present state of the art is derived from studies of the dehydration of ethanol in the presence of alumina. With such prior art catalysts at temperatures of 300° C. and above, the reaction products resulting from the dehydration of ethanol are almost entirely ethylene and water. At temperatures below 300° C. progressively more and more diethyl ether appears until below 260° C., ether and water are substantially the only products.

It is an object of the present invention to produce olefins by the dehydration of alcohols by an efficient process which can take place quantitatively at temperatures below 300° C.

The particular catalyst useful in this invention is the hydrogen exchanged form of a zeolite of the mordenite type as disclosed and claimed in copending application Serial No. 80,552 of Leonard B. Sand, filed January 4, 1961, now abandoned. This catalytic material per se and the methods for making it form no part of the present invention.

The crystalline catalytic materials useful in my invention, may, as taught in the Sand application, be formed by heating a silico-alumina source such as commercial pumice with sodium silicate. The material may also be formed by heating an amorphous silica with sodium aluminate and sodium silicate. The conditions and techniques for making mordenites are more fully specified in the application of Leonard B. Sands referred to above. The material possesses the mordenite crystal structure and can be represented by the formula $H_2Al_2Si_{10}O_{24}(H_2O)_{6.7}$ when fully hydrated. Naturally, the above is an idealized formula. Depending on the degree of acid treatment, a portion of the aluminum may be removed from the material without apparent change in the structure. Then the silicon to aluminum ratio may not be exactly 5 to 1, but may be higher. It is the hydrogen exchanged form of synthetic mordenite which has been found as particularly useful in this invention. Such material may be produced, for example, by treatment of a synthetic mordenite in the sodium cation form with six normal sulfuric acid for one hour.

The following examples illustrate the synthesis of the catalyst of this invention:

EXAMPLE I

Finely divided pumice, 1 part, was placed in an autoclave with 2 parts of a 32% aqueous sodium silicate solution and the mixture heated for 24 hours at 150° C. The resulting mordenite crystals had the following analysis:

SiO₂ ----------------------------------- 70.29
Al₂O₃ ---------------------------------- 13.32
Fe₂O₃ ---------------------------------- 0.84
TiO₂ ----------------------------------- 0.08
CaO ------------------------------------ 0.60
MgO ------------------------------------ 0.17
Na₂O ----------------------------------- 4.27
K₂O ------------------------------------ 3.43
Ignition loss -------------------------- 6.68

The above analysis may be expressed by the following elemental formula:

$$\left(Na, K, \frac{Ca}{2}\right)_2 Al_2Si_9O_{22} \cdot 2.8H_2O$$

EXAMPLE II

Amorphous silica, 340 parts, was heated to 150° C. with 100 parts of sodium aluminate $$(1.1Na_2O \cdot Al_2O_3 \cdot 3H_2O)$$

and 590 parts of 28% solution of sodium silicate in an autoclave for 24 hours. This mordenite had the formula $Na_2Al_2Si_{10}O_{24}(H_2O)_{6.7}$ as compared to the general formula $(Ca/2, Na, K)_2Al_2Si_{9-10}O_{22-24}(H_2O)_{6.7}$ for natural mordenites and the synthetic mordenite containing calcium and potassium as well as sodium of Example I.

The mordenites of Examples I and II can both be acid leached to produce hydrogen mordenite.

Illustrative of the process of this invention, a sample of about 250 to 300 parts of catalyst is heated to temperatures ranging from 250° C. to 350° C. A stream of inert gas passing over the catalyst is injected with from one to five parts of absolute ethyl alcohol. A summary of the results of a series of such runs at a contact time of about 3 seconds is as follows:

Table I

| Catalyst | Temperature, °C. | Yield, percent (excluding H₂O) | |
| --- | --- | --- | --- |
| | | Ethylene | Ether |
| Fused Alumina | 320 | 0 | 0 |
| Activated Alumina | 340 | 50 | ¹ 50 |
| Hydrogen Exchanged Mordenite | 240 | 100 | 0 |

¹ Approximate.

Although the invention has been illustrated by the use of ethyl alcohol, other low molecular weight alcohols capable of being treated in the vapor phase in a similar manner may be converted to olefins by dehydration in the presence of synthetic hydrogen exchanged mordenite.

The results summarized in Table I indicate that the hydrogen exchanged form of mordenite is a dehydrating agent of high activity.

What is claimed is:
1. A process for dehydration of alcohols to form olefins comprising contacting at a reaction temperature below 300° C. a normal alcohol, in the vapor phase, with mordenite in the hydrogen exchanged form.
2. A process for the dehydration of ethyl alcohol to form ethylene comprising contacting said ethyl alcohol at a reaction temperature below 300° C. in the vapor phase with mordenite in the hydrogen exchanged form.

3. A process according to claim 2 in which the temperature at which the dehydration takes place is less than 300° C., and in which substantially no ethyl ether is formed.

4. A process according to claim 2 in which the reaction temperature is about 240° C.

References Cited by the Examiner

UNITED STATES PATENTS

| 1,914,722 | 6/1933 | Jaeger | 260—682 |
| 2,971,904 | 2/1961 | Gladrew et al. | 208—135 |
| 3,033,778 | 5/1962 | Frilette | 208—120 |
| 3,039,953 | 6/1962 | Eng | 208—26 |

ALPHONSO D. SULLIVAN, *Primary Examiner.*